(12) United States Patent
Hwang et al.

(10) Patent No.: US 9,709,132 B2
(45) Date of Patent: Jul. 18, 2017

(54) PLANETARY GEAR TRAIN OF AUTOMATIC TRANSMISSION FOR VEHICLES

(71) Applicant: Hyundai Motor Company, Seoul (KR)

(72) Inventors: Seong Wook Hwang, Gunpo-si (KR); Seongwook Ji, Ansan-si (KR); Myeong Hoon Noh, Seongnam-si (KR); Kangsoo Seo, Yongin-si (KR); Jae Chang Kook, Hwaseong-si (KR); Won-Jun Sung, Seoul (KR); Wonmin Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 198 days.

(21) Appl. No.: 14/466,783

(22) Filed: Aug. 22, 2014

(65) Prior Publication Data

US 2015/0148178 A1 May 28, 2015

(30) Foreign Application Priority Data

Nov. 27, 2013 (KR) .......................... 10-2013-0145220

(51) Int. Cl.
*F16H 3/44* (2006.01)
*F16H 3/66* (2006.01)

(52) U.S. Cl.
CPC ......... *F16H 3/66* (2013.01); *F16H 2003/445* (2013.01); *F16H 2200/006* (2013.01);
(Continued)

(58) Field of Classification Search
CPC ....... F16H 2003/445; F16H 2200/2007; F16H 2200/006; F16H 2200/2046
See application file for complete search history.

(56) References Cited

U.S. PATENT DOCUMENTS 5,013,289 A * 5/1991 Van Maanen ............. F16H 3/66
475/218
5,520,587 A * 5/1996 Hall, III .................... F16H 3/66
475/218
(Continued)

OTHER PUBLICATIONS

Definition of "transfer gears," taken from http://www.larapedia.com/glossary_of_technical_and_automotive_terms/transfer_gears_meaning_in_technical_and_automotive_terminology.html on Jun. 6, 2016.*

*Primary Examiner* — Stacey Fluhart
(74) *Attorney, Agent, or Firm* — Morgan, Lewis & Bockius LLP

(57) ABSTRACT

A planetary gear train may include an input shaft, an output shaft, first and second planetary gear sets each having three rotation elements, a first rotation shaft directly connected to one rotation element of the second planetary gear set and selectively connected to the input shaft, a second rotation shaft directly connected to one rotation element of the first planetary gear set and another rotation element of the second planetary gear set, and directly connected to the output shaft, a third rotation shaft directly connected to another rotation element of the first planetary gear set and the remaining rotation element of the second planetary gear set, and selectively connected to the input shaft and/or selectively connected to a transmission housing, and a fourth rotation shaft directly connected to the remaining rotation element of the first planetary gear set, and selectively connected to the input shaft through two paths and/or selectively connected to the transmission housing.

10 Claims, 6 Drawing Sheets

(52) U.S. Cl.
CPC .............. *F16H 2200/2007* (2013.01); *F16H 2200/2046* (2013.01)

(56) References Cited

U.S. PATENT DOCUMENTS

| | | | | |
|---|---|---|---|---|
| 5,520,588 | A * | 5/1996 | Hall, III | F16H 3/66 475/218 |
| 6,250,415 | B1 * | 6/2001 | Seto | B60K 17/22 180/337 |
| 8,414,442 | B2 * | 4/2013 | Seo | F16H 3/666 475/218 |
| 2004/0092357 | A1 * | 5/2004 | Biermann | F16H 37/042 475/296 |
| 2013/0053206 | A1 * | 2/2013 | Lee | F16H 37/04 475/275 |

* cited by examiner

FIG. 3

|      | C1 | C2 | B1 | B2 | DC |
|------|----|----|----|----|----|
| 1ST  | ●  |    | ●  |    | neutral |
| 2ND  | ●  |    |    | ●  | neutral |
| 3RD  | ●  |    |    |    | TF3 |
| 4TH  | ●  |    |    |    | TF2 |
| 5TH  | ●  | ●  |    |    | neutral |
| 6TH  |    | ●  |    |    | TF2 |
| 7TH  |    | ●  |    |    | TF3 |
| 8TH  |    | ●  |    | ●  | neutral |
| REV  |    |    | ●  |    | TF2 |

PLANETARY GEAR TRAIN OF AUTOMATIC TRANSMISSION FOR VEHICLES

CROSS-REFERENCE TO RELATED APPLICATION

The present application claims priority of Korean Patent Application Number 10-2013-0145220 filed on Nov. 27, 2013, the entire contents of which application are incorporated herein for all purposes by this reference.

BACKGROUND OF INVENTION

Field of Invention

The present invention relates to an automatic transmission for a vehicle. More particularly, the present invention relates to a planetary gear train of an automatic transmission for a vehicle that can improve power delivery performance and reduce fuel consumption at a low-speed driving.

Description of Related Art

Typically, multiple-shift mechanism of an automatic transmission is achieved by combining a plurality of planetary gear sets and a plurality of frictional elements. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a planetary gear train of an automatic transmission for a vehicle having advantages of achieving eight forward speeds and one reverse speed by disposing first and second planetary gear sets on an output shaft and connecting rotation elements of the first and second planetary gear sets to an input shaft through a plurality of transfer gears.

In addition, the present invention has been made in an effort to provide a planetary gear train of an automatic transmission for a vehicle having further advantages of enabling of setting optimum gear ratios due to ease of changing gear ratios by using the plurality of transfer gears, and accordingly improving power delivery performance and fuel economy at a low-speed driving.

A planetary gear train of an automatic transmission for a vehicle according to various aspects of the present invention may include: an input shaft receiving torque; an output shaft disposed in parallel with and apart from the input shaft; a first planetary gear set having three rotation elements; a second planetary gear set having three rotation elements; a first rotation shaft directly connected to one rotation element of the second planetary gear set and selectively connected to the input shaft; a second rotation shaft directly connected to one rotation element of the first planetary gear set and another rotation element of the second planetary gear set, and directly connected to the output shaft; a third rotation shaft directly connected to another rotation element of the first planetary gear set and the remaining rotation element of the second planetary gear set, and selectively connected to the input shaft and/or selectively connected to a transmission housing; and a fourth rotation shaft directly connected to the remaining rotation element of the first planetary gear set, and selectively connected to the input shaft through two paths and/or selectively connected to the transmission housing.

The planetary gear train may further include three transfer gears disposed respectively between the input shaft and the first and third rotation shafts and on the two paths. The planetary gear train may further include a dog clutch selectively transmitting torque of the input shaft to any one of the two paths or not transmitting the torque of the input shaft to either of the two paths. Each of the first and second planetary gear sets may be a single pinion planetary gear set.

The first rotation shaft may be connected to a second sun gear of the second planetary gear set, the second rotation shaft may be connected to a first ring gear of the first planetary gear set and a second planet carrier of the second planetary gear set, the third rotation shaft may be connected to a first planet carrier of the first planetary gear set and a second ring gear of the second planetary gear set, and the fourth rotation shaft may be connected to a first sun gear of the first planetary gear set.

The three transfer gears may include: a first transfer gear disposed between the input shaft and the first and third rotation shafts; a second transfer gear disposed on one of the two paths; and a third transfer gear disposed on the other of the two paths. Gear ratios of the three transfer gears may be different from each other.

The planetary gear train may further include: a first clutch disposed between the first transfer gear and the first rotation shaft; a second clutch disposed between the first transfer gear and the third rotation shaft; a first brake disposed between the third rotation shaft and the transmission housing; and a second brake disposed between the fourth rotation shaft and the transmission housing.

The first transfer gear and the first and second clutches may be disposed at one side of the first planetary gear set, and the second and third transfer gears and the first and second brakes may be disposed at the other side of the first planetary gear set.

A planetary gear train of an automatic transmission for a vehicle according to various other aspects of the present invention may include: an input shaft receiving torque; an output shaft disposed in parallel with and apart from the input shaft; a first planetary gear set including a first sun gear, a first planet carrier, and a first ring gear as rotation elements thereof; a second planetary gear set including a second sun gear, a second planet carrier, and a second ring gear as rotation elements thereof and disposed adjacent to the first planetary gear set; a first rotation shaft directly connected to the second sun gear and selectively connected to the input shaft; a second rotation shaft directly connected to the first ring gear and the second planet carrier and directly connected to the output shaft; a third rotation shaft directly connected to the first planet carrier and the second ring gear and selectively connected to the input shaft and/or selectively connected to a transmission housing; a fourth rotation shaft directly connected to the first sun gear and selectively connected to the input shaft and/or selectively connected to the transmission housing; and a dog clutch selectively connecting the input shaft to the fourth rotation shaft through two paths.

Each of the first and second planetary gear sets may be a single pinion planetary gear set. The planetary gear train may further include: a first transfer gear disposed between the input shaft and the first and third rotation shafts; a second transfer gear disposed on one of the two paths; and a third transfer gear disposed on the other of the two paths. Gear ratios of the three transfer gears may be different from each other.

The planetary gear train may further include: a first clutch disposed between the first transfer gear and the first rotation shaft; a second clutch disposed between the first transfer gear and the third rotation shaft; a first brake disposed between the third rotation shaft and the transmission housing; and a second brake disposed between the fourth rotation shaft and the transmission housing.

The first transfer gear and the first and second clutches may be disposed at one side of the first planetary gear set, and the second and third transfer gears and the first and second brakes may be disposed at the other side of the first planetary gear set. The dog clutch may be adapted to selectively transmit torque of the input shaft to any one of the two paths or not to transmit the torque of the input shaft to either of the two paths.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is an operational chart of friction elements at each shift-speed applied to an exemplary planetary gear train according to the present invention.

DETAILED DESCRIPTION

Figure 1:
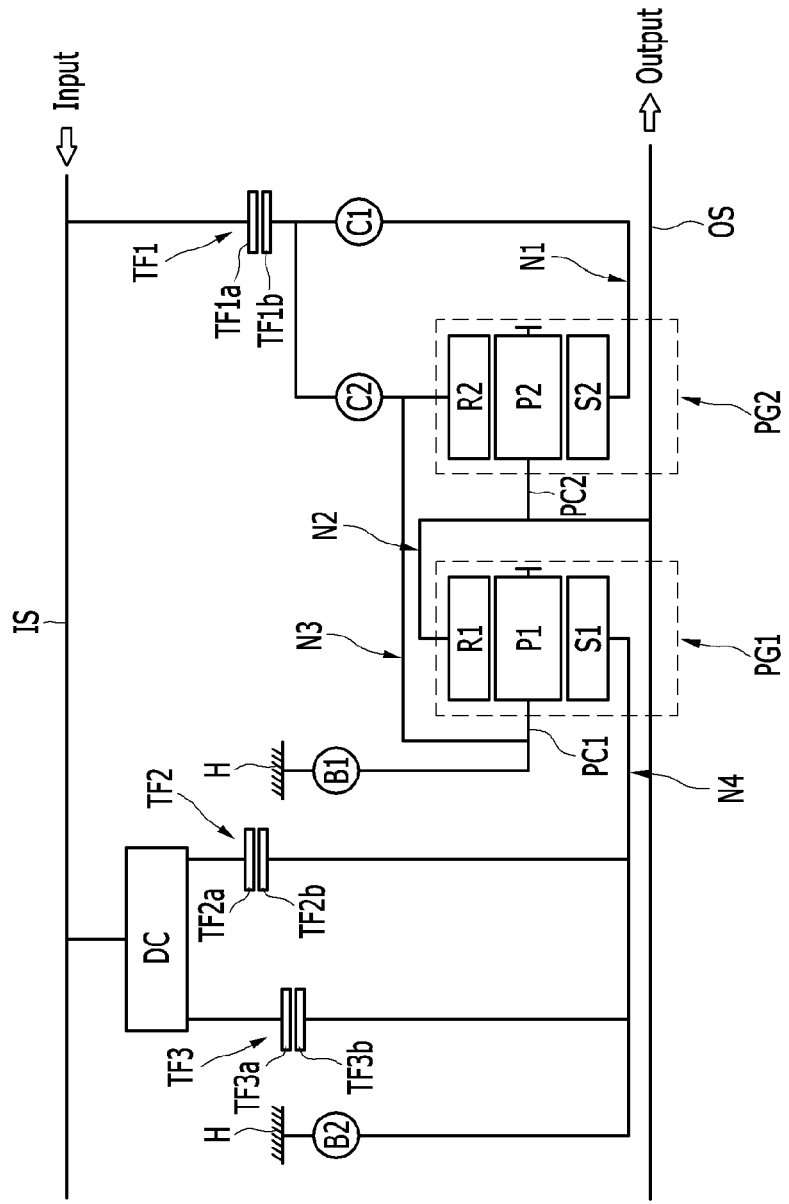
FIG. 1 is a schematic diagram of an exemplary planetary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiment will be omitted, and the same constituent elements are denoted by the same reference numerals in this specification. In the detailed description, ordinal numbers are used for distinguishing constituent elements having the same terms, and have no specific meanings.

FIG. 1 is a schematic diagram of a planetary gear train according to various embodiments of the present invention. Referring to FIG. 1, a planetary gear train according to various embodiments of the present invention includes an input shaft IS receiving torque of an engine, an output shaft OS disposed in parallel or substantially in parallel with and apart from the input shaft IS, first and second planetary gear sets PG1 and PG2 disposed on the output shaft OS, three transfer gears TF1, TF2, and TF3, a dog clutch DC, and frictional elements including two clutches C1 and C2 and two brakes B1 and B2.

Therefore, torque input from the input shaft IS is converted into eight forward speeds and one reverse speed by cooperation of the first and second planetary gear sets PG1 and PG2, and is then output through the output shaft OS.

The input shaft IS is an input member and receives torque from a crankshaft of the engine. The output shaft OS drives a driving shaft including a driving wheel through a final reduction gear and a differential apparatus. The first and second planetary gear sets PG1 and PG2 are disposed on the output shaft OS and are combined with each other so as to include four rotation shafts N1, N2, N3, and N4.

The first planetary gear set PG1 is a single pinion planetary gear set, and includes a first sun gear S1, a first planet carrier PC1 rotatably supporting a first pinion P1 externally meshed with the first sun gear S1, and a first ring gear R1 internally meshed with as rotation elements thereof.

The second planetary gear set PG2 is a single pinion planetary gear set, and includes a second sun gear S2, a second planet carrier PC2 rotatably supporting a second pinion P2 externally meshed with the second sun gear S2, and a second ring gear R2 internally meshed with the second pinion P2 as rotation elements thereof.

The first planet carrier PC1 is directly connected to the second ring gear R2 and the first ring gear R1 is directly connected to the second planet carrier PC2 such that the first and second planetary gear sets PG1 and PG2 are operated as a compound planetary gear set including four rotation shafts N1, N2, N3, and N4.

The first rotation shaft N1 is directly connected to the second sun gear S2 and is selectively connected to the input shaft IS. The second rotation shaft N2 is directly connected to the first ring gear R1 and the second planet carrier PC2, and is directly connected to the output shaft OS so as to be always operated as an output element. The third rotation shaft N3 is directly connected to the first planet carrier PC1 and the second ring gear R2, and is selectively connected to the input shaft IS and/or selectively connected to a transmission housing H. The fourth rotation shaft N4 is directly connected to the first sun gear S1, and is selectively connected to the input shaft IS through two paths and/or selectively connected to the transmission housing H.

The first, second, and third transfer gears TF1, TF2, and TF3 respectively have first, second, and third transfer drive gears TF1a, TF2a, and TF3a and first, second, and third transfer driven gears TF1b, TF2b, and TF3b externally meshed with each other. In addition, gear ratios of the first, second, and third transfer gears TF1, TF2, and TF3 may be set according to target speed ratios. For example, the gear ratio of the second transfer gear TF2 is greater than that of the first transfer gear TF1 and is smaller than that of the third transfer gear TF3.

Connections of the first, second, and third transfer gears TF1, TF2, and TF3 will be described in detail.

The first transfer gear TF1 connects the first rotation shaft N1 and the third rotation shaft N3 to the input shaft IS. That is, the first transfer drive gear TF1a is connected to the input shaft IS and the first transfer driven gear TF1b is connected to the first rotation shaft N1 and the third rotation shaft N3. The second transfer gear TF2 connects the fourth rotation shaft N4 to the input shaft IS. That is, the second transfer drive gear TF2a is connected to the input shaft IS and the second transfer driven gear TF2b is connected to the fourth rotation shaft N4. The third transfer gear TF3 connects the fourth rotation shaft N4 to the input shaft IS. That is, the third transfer drive gear TF3a is connected to the input shaft IS and the third transfer driven gear TF3b is connected to the fourth rotation shaft N4.

The dog clutch DC is widely used in a manual transmission. The dog clutch DC selectively transmits torque of the input shaft IS to the second transfer gear TF2 or the third transfer gear TF3, or does not transmit the torque of the input shaft IS to either of the second and the third transfer gears TF2 and TF3.

In addition, two clutches C1 and C2 connecting selected rotation shafts to the input shaft IS and two brakes B1 and B2 connecting selected rotation shafts to the transmission housing H are disposed as follows.

The first clutch C1 is disposed between the first transfer driven gear TF1b of the first transfer gear TF1 and the first rotation shaft N1. The second clutch C2 is disposed between the first transfer driven gear TF1b of the first transfer gear TF1 and the third rotation shaft N3. The first brake B1 is disposed between the third rotation shaft N3 and the transmission housing H. The second brake B2 is disposed between the fourth rotation shaft N4 and the transmission housing H.

The frictional elements including the first and second clutches C1 and C2 and the first and second brakes B1 and B2 may be conventional multi-plate friction elements of wet type that are operated by hydraulic pressure.

The first transfer gear TF1 and the first and second clutches C1 and C2 are disposed at one side of the first planetary gear set PG1, and the second and third transfer gears TF2 and TF3 and the first and second brakes B1 and B2 are disposed at the other side of the first planetary gear set PG1.

FIG. 2 is a drawing for illustrating operation of a dog clutch used in a planetary gear train according to various embodiments of the present invention. Referring to FIG. 2, the dog clutch DC includes a dog clutch hub DCH, a dog clutch sleeve DCS, and first and second dog clutch gears DCG1 and DCG2.

The dog clutch hub DCH is directly connected to the input shaft IS and always receive the torque of the input shaft IS. The dog clutch sleeve DCS is splined to an exterior circumferential portion of the dog clutch hub DCH so as to be slidable in an axial direction, and moves in the axial direction by an actuator.

The first and second dog clutch gears DCG1 and DCG2 are directly connected respectively to the third and second transfer gears TF3 and TF2. The first and second dog clutch gears DCG1 and DCG2 are selectively engaged with the dog clutch sleeve DCS and selectively receive the torque of the input shaft IS.

Figure 2A:
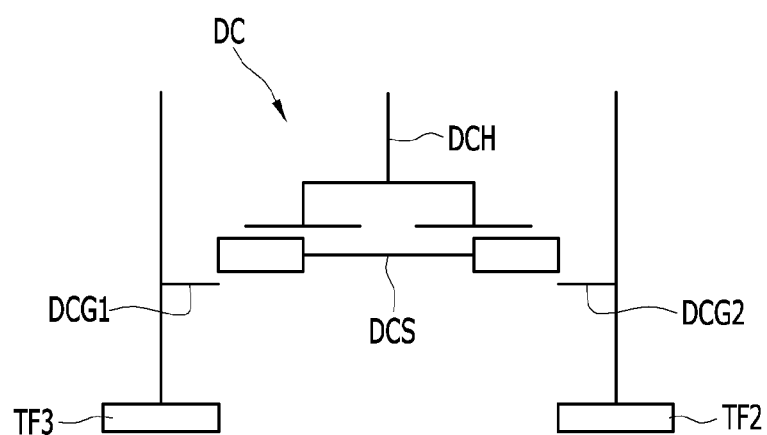
FIG. 2A is a drawing for illustrating operation of a dog clutch used in an exemplary planetary gear train according to the present invention.

FIG. 2A illustrates the dog clutch DC at a neutral state. As shown in FIG. 2A, the dog clutch sleeve DCS is poisoned at the center and is not engaged to neither of the first and second dog clutch gears DCG1 and DCG2 at the neutral state.

Figure 2B:
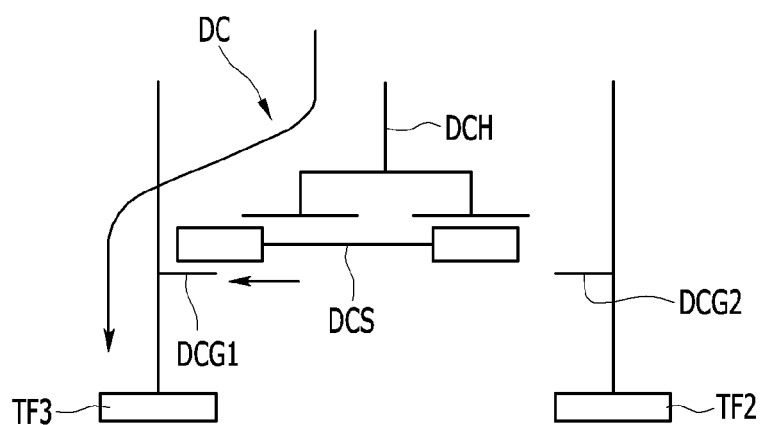
FIG. 2B is a drawing for illustrating operation of a dog clutch used in an exemplary planetary gear train according to the present invention.

FIG. 2B illustrates that the torque of the input shaft IS is transmitted to the third transfer gear TF3. As shown in FIG. 2B, if the dog clutch sleeve DCS moves to the left in the drawings by the actuator, the dog clutch hub DCH and the first dog clutch gear DCG1 are operably connected. In this case, the torque of the input shaft IS is transmitted to the third transfer gear TF3 through the dog clutch DC.

Figure 2C:
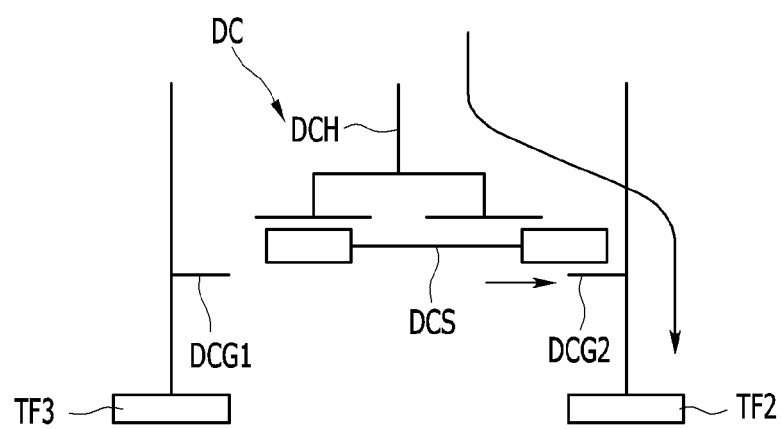
FIG. 2C is a drawing for illustrating operation of a dog clutch used in an exemplary planetary gear train according to the present invention.

FIG. 2C illustrates that the torque of the input shaft IS is transmitted to the second transfer gear TF2. As shown in FIG. 2C, if the dog clutch sleeve DCS moves to the right in the drawings by the actuator, the dog clutch hub DCH and the second dog clutch gear DCG2 are operably connected. In this case, the torque of the input shaft IS is transmitted to the second transfer gear TF2 through the dog clutch DC.

FIG. 3 is an operational chart of friction elements at each shift-speed applied to a planetary gear train according to various embodiments of the present invention. Referring to FIG. 3, two frictional elements or one frictional element and the dog clutch DC are operated at each shift-speed according to various embodiments of the present invention.

The first clutch C1 and the first brake B1 are operated and the dog clutch DC stays at the neutral state at a first forward speed 1ST.

The first clutch C1 and the second brake B2 are operated and the dog clutch DC stays at the neutral state at a second forward speed 2ND.

The first clutch C1 is operated and the dog clutch DC is operably connected to the third transfer gear TF3 at a third forward speed 3RD.

The first clutch C1 is operated and the dog clutch DC is operably connected to the second transfer gear TF2 at a fourth forward speed 4TH.

The first clutch C1 and the second clutch C2 are operated and the dog clutch DC stays at the neutral state at a fifth forward speed 5TH.

The second clutch C2 is operated and the dog clutch DC is operably connected to the second transfer gear TF2 at a sixth forward speed 6TH.

The second clutch C2 is operated and the dog clutch DC is operably connected to the third transfer gear TF3 at a seventh forward speed 7TH.

The second clutch C2 and the second brake B2 are operated and the dog clutch DC stays at the neutral state at an eighth forward speed 8TH.

The first brake B1 is operated and the dog clutch DC is operably connected to the second transfer gear TF2 at a reverse speed REV.

Figure 4:
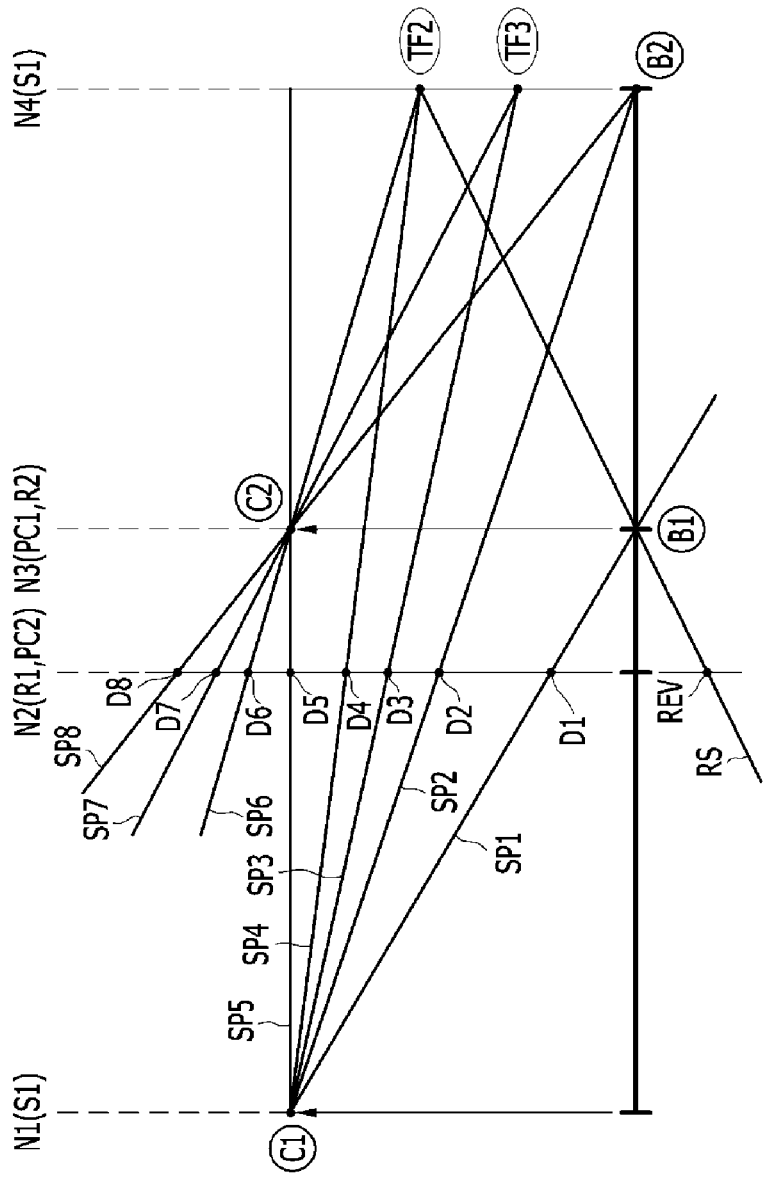
FIG. 4 is a lever diagram of an exemplary planetary gear train according to the present invention.

FIG. 4 is a lever diagram of a planetary gear train according to various embodiments of the present invention and illustrates shift processes of the planetary gear train according to various embodiments of the present invention by lever analysis method.

Referring to FIG. 4, four vertical lines of the first and second planetary gear sets PG1 and PG2 are set as the first, second, third, and fourth rotation shafts N1, N2, N3, and N4 from the left to the right. In addition, a lower horizontal line represents a rotation speed of "0", an upper portion of the horizontal line represents positive rotation speed, and a lower portion of the horizontal line represents negative rotation speed.

At this time, although rotation speed input to each rotation shaft is negative rotation speed, for better comprehension and ease of description, it is illustrates that positive rotation speed is input to each rotation shaft.

Hereinafter, referring to FIG. 3 and FIG. 4, the shift processes of the planetary gear train according to various embodiments of the present invention will be described in detail.

First Forward Speed

Referring to FIG. 3, the first clutch C1 and the first brake B1 are operated and the dog clutch DC stays at the neutral state at the first forward speed 1ST.

As shown in FIG. 4, since the dog clutch DC stays at the neutral state, the torque of the input shaft IS is not input to the fourth rotation shaft N4 and is input to the first rotation shaft N1 through the first transfer gear TF1 by operation of the first clutch C1. In addition, the third rotation shaft N3 is stopped by operation of the first brake B1. Therefore, the rotation shafts form a first shift line SP1 and D1 is output through the second rotation shaft N2 that is the output element.

Second Forward Speed

The first brake B1 that was operated at the first forward speed 1ST is released and the second brake B2 is operated at the second forward speed 2ND.

In this case, since the dog clutch DC stays at the neutral state, the torque of the input shaft IS is not input to the fourth rotation shaft N4 and is input to the first rotation shaft N1 through the first transfer gear TF1 by operation of the first clutch C1. In addition, the fourth rotation shaft N4 is stopped by operation of the second brake B2. Therefore, the rotation shafts form a second shift line SP2 and D2 is output through the second rotation shaft N2 that is the output element.

Third Forward Speed

The second brake B2 that was operated at the second forward speed 2ND is released and the dog clutch DC is operably connected to the third transfer gear TF3 at the third forward speed 3RD.

In this case, the torque of the input shaft IS is input to the first rotation shaft N1 through the first transfer gear TF1 by operation of the first clutch C1 and is input to the fourth rotation shaft N4 through the third transfer gear TF3. Therefore, the rotation shafts form a third shift line SP3 by the gear ratios of the first transfer gear TF1 and the third transfer gear TF3, and D3 is output through the second rotation shaft N2 that is the output element.

Fourth Forward Speed

If the dog clutch DC is released from the third transfer gear TF3 and is operably connected to the second transfer gear TF2 at the third forward speed 3RD, the fourth forward speed 4TH is achieved.

In this case, the torque of the input shaft IS is input to the first rotation shaft N1 through the first transfer gear TF1 by operation of the first clutch C1 and is input to the fourth rotation shaft N4 through the second transfer gear TF2. Therefore, the rotation shafts form a fourth shift line SP4 by the gear ratios of the first transfer gear TF1 and the second transfer gear TF2, and D4 is output through the second rotation shaft N2 that is the output element.

Fifth Forward Speed

If the dog clutch DC returns to the neutral state and the second clutch C2 is operated at the fourth forward speed 4TH, the fifth forward speed 5TH is achieved.

In this case, the torque of the input shaft IS is input to the first rotation shaft N1 and the third rotation shaft N3 through the first transfer gear TF1 by operation of the first clutch C1 and the second clutch C2. Therefore, the first and second planetary gear sets PG1 and PG2 become direct-coupling state, the rotation shafts form a fifth shift line SP5, and D5 is output through the second rotation shaft N2 that is the output element.

Sixth Forward Speed

The first clutch C1 that was operated at the fifth forward speed 5TH is released and the dog clutch DC is operably connected to the second transfer gear TF2 at the sixth forward speed 6TH.

In this case, the torque of the input shaft IS is input to the third rotation shaft N3 through the first transfer gear TF1 by operation of the second clutch C2 and is input to the fourth rotation shaft N4 through the second transfer gear TF2. Therefore, the rotation shafts form a sixth shift line SP6 by the gear ratios of the first transfer gear TF1 and the second transfer gear TF2, and D6 is output through the second rotation shaft N2 that is the output element.

Seventh Forward Speed

If the dog clutch DC is released from the second transfer gear TF2 and is operably connected to the third transfer gear TF3 at the sixth forward speed 6TH, the seventh forward speed 7TH is achieved.

In this case, the torque of the input shaft IS is input to the third rotation shaft N3 through the first transfer gear TF1 by operation of the second clutch C2 and is input to the fourth rotation shaft N4 through the third transfer gear TF3.

Therefore, the rotation shafts form a seventh shift line SP7 by the gear ratios of the first transfer gear TF1 and the third transfer gear TF3, and D7 is output through the second rotation shaft N2 that is the output element.

Eighth Forward Speed

If the dog clutch DC returns to the neutral state and the second brake B2 is operated at the seventh forward speed 7TH, the eighth forward speed 8TH is achieved.

In this case, the torque of the input shaft IS is input to the third rotation shaft N3 through the first transfer gear TF1 by operation of the second clutch C2, and the fourth rotation shaft N4 is stopped by operation of the second brake B2. Therefore, the rotation shafts form an eighth shift line SP8 and D8 is output through the second rotation shaft N2 that is the output element.

Reverse Speed

The first brake B1 is operated and the dog clutch DC is operably connected to the second transfer gear TF2 at the reverse speed REV.

In this case, the torque of the input shaft IS is input to the fourth rotation shaft N4 through the second transfer gear TF2, and the third rotation shaft N3 is stopped by operation of the first brake B1. Therefore, the rotation shafts form a reverse shift line RS and REV is output through the second rotation shaft N2 that is the output element.

The planetary gear train according to various embodiments of the present invention can achieve eight forward speeds and one reverse speed by combining two planetary gear sets PG1 and PG2 being the simple planetary gear sets with three transfer gears TF1, TF2, and TF3 being the externally-meshed gears, four frictional elements C1, C2, B1, and B2, and the dog clutch DC.

Since the first, second, and third transfer gears TF1, TF2, and TF3 and the dog clutch DC are used, at least one planetary gear set and two frictional elements may be removed, compared with the planetary gear train. Therefore, manufacturing cost may be curtained by reducing the number of components.

In addition, optimum gear ratios may be set due to ease of changing gear ratios by using the first, second, and third transfer gears TF1, TF2, and TF3 as well as the first and second planetary gear sets PG1 and PG2. Since the gear ratios can be changed according to target performance, starting performance, power delivery performance and fuel economy may be improved.

In addition, two frictional elements or one frictional element and the dog clutch are operated at each shift-speed, and one frictional element is released and another friction element is operated or only the dog clutch changes its operating state so as to shift to a neighboring shift-speed. Therefore, shift control condition is fully satisfied.

For convenience in explanation and accurate definition in the appended claims, the terms "upper" or "lower", "left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
    an input shaft receiving torque;
    an output shaft disposed in parallel with and apart from the input shaft;
    a first planetary gear set having three rotation elements;
    a second planetary gear set having three rotation elements;
    a first rotation shaft directly connected to one rotation element of the second planetary gear set and selectively connected to the input shaft;
    a second rotation shaft directly connected to one rotation element of the first planetary gear set and another rotation element of the second planetary gear set, and directly connected to the output shaft;
    a third rotation shaft directly connected to another rotation element of the first planetary gear set and the remaining rotation element of the second planetary gear set, and selectively connected to the input shaft and selectively connected to a transmission housing;
    a fourth rotation shaft directly connected to the remaining rotation element of the first planetary gear set, and selectively connected to the input shaft through two paths and selectively connected to the transmission housing independently from the two paths;
    a dog clutch selectively transmitting torque of the input shaft to any one of the two paths or not transmitting the torque of the input shaft to either of the two paths;
    three transfer gears disposed respectively between the input shaft and the first and third rotation shafts and on the two paths, wherein the three transfer gears comprise:
        a first transfer gear disposed between the input shaft and the first and third rotation shafts;
        a second transfer gear disposed on one of the two paths; and
        a third transfer gear disposed on the other of the two paths,
    a first clutch disposed between the first transfer gear and the first rotation shaft;
    a second clutch disposed between the first transfer gear and the third rotation shaft;
    a first brake disposed between the third rotation shaft and the transmission housing; and
    a second brake disposed between the fourth rotation shaft and the transmission housing.

2. The planetary gear train of claim 1, wherein each of the first and second planetary gear sets is a single pinion planetary gear set.

3. The planetary gear train of claim 1, wherein the first rotation shaft is connected to a second sun gear of the second planetary gear set,
    the second rotation shaft is connected to a first ring gear of the first planetary gear set and a second planet carrier of the second planetary gear set,
    the third rotation shaft is connected to a first planet carrier of the first planetary gear set and a second ring gear of the second planetary gear set, and
    the fourth rotation shaft is connected to a first sun gear of the first planetary gear set.

4. The planetary gear train of claim 1, wherein gear ratios of the three transfer gears are different from each other.

5. The planetary gear train of claim 1, wherein the first transfer gear and the first and second clutches are disposed at one side of the first planetary gear set, and the second and third transfer gears and the first and second brakes are disposed at the other side of the first planetary gear set.

6. A planetary gear train of an automatic transmission for a vehicle comprising:
    an input shaft receiving torque;
    an output shaft disposed in parallel with and apart from the input shaft;
    a first planetary gear set including a first sun gear, a first planet carrier, and a first ring gear as rotation elements thereof;
    a second planetary gear set including a second sun gear, a second planet carrier, and a second ring gear as rotation elements thereof and disposed adjacent to the first planetary gear set;
    a first rotation shaft directly connected to the second sun gear and selectively connected to the input shaft;
    a second rotation shaft directly connected to the first ring gear and the second planet carrier and directly connected to the output shaft;
    a third rotation shaft directly connected to the first planet carrier and the second ring gear and selectively connected to the input shaft and selectively connected to a transmission housing;
    a fourth rotation shaft directly connected to the first sun gear and selectively connected to the input shaft and selectively connected to the transmission housing independently from independently from a connection between the fourth rotation shaft and the input shaft;
    a dog clutch selectively connecting the input shaft to the fourth rotation shaft through two paths;

a first transfer gear disposed between the input shaft and the first and third rotation shafts;
a second transfer gear disposed on one of the two paths;
a third transfer gear disposed on the other of the two paths;
a first clutch disposed between the first transfer gear and the first rotation shaft;
a second clutch disposed between the first transfer gear and the third rotation shaft;
a first brake disposed between the third rotation shaft and the transmission housing; and
a second brake disposed between the fourth rotation shaft and the transmission housing.

7. The planetary gear train of claim 6, wherein each of the first and second planetary gear sets is a single pinion planetary gear set.

8. The planetary gear train of claim 6, wherein gear ratios of the three transfer gears are different from each other.

9. The planetary gear train of claim 6, wherein the first transfer gear and the first and second clutches are disposed at one side of the first planetary gear set, and the second and third transfer gears and the first and second brakes are disposed at the other side of the first planetary gear set.

10. The planetary gear train of claim 6, wherein the dog clutch is adapted to selectively transmit torque of the input shaft to any one of the two paths or not to transmit the torque of the input shaft to either of the two paths.

\* \* \* \* \*